United States Patent [19]
Chevallier et al.

[11] Patent Number: 6,050,636
[45] Date of Patent: Apr. 18, 2000

[54] VEHICLE SEAT PROVIDED WITH A LATERAL AIRBAG

[75] Inventors: Claude Chevallier, Itteville; Pascal Lhuissier, Beaugency; Gilbert Soulard, Bouville, all of France

[73] Assignee: Bertrand Faure Equipements SA, Boulogne, France

[21] Appl. No.: 09/216,336

[22] Filed: Dec. 18, 1998

[30] Foreign Application Priority Data

Dec. 26, 1997 [FR] France .................................. 97 16575

[51] Int. Cl.[7] ...................................................... B60N 2/42
[52] U.S. Cl. .................... 297/216.13; 280/728.1
[58] Field of Search ........................... 297/216.1, 216.13, 297/216.14, DIG. 3; 280/730.1, 730.2, 728.1, 728.3

[56] References Cited

U.S. PATENT DOCUMENTS

| 5,498,030 | 3/1996 | Hill et al. . |
| 5,588,671 | 12/1996 | Boumarafi et al. .................. 280/730.2 |
| 5,749,597 | 5/1998 | Saderholm . |
| 5,816,610 | 10/1998 | Higashiura et al. . |
| 5,860,673 | 1/1999 | Hasegawa et al. . |
| 5,890,734 | 4/1999 | Saderholm . |
| 5,893,578 | 4/1999 | Berger . |
| 5,893,579 | 4/1999 | Kimura et al. . |
| 5,927,749 | 7/1999 | Homier et al. . |
| 5,938,232 | 8/1999 | Kalandek et al. . |

FOREIGN PATENT DOCUMENTS

| 0 768 215 | 4/1997 | European Pat. Off. . |
| 0 768 216 | 4/1997 | European Pat. Off. . |
| 0 769 429 | 4/1997 | European Pat. Off. . |
| 297 07 182 U | 8/1997 | Germany . |

OTHER PUBLICATIONS

French Preliminary Search Report dated Sep. 4, 1998, French Appl. No. FR 9716575.

*Primary Examiner*—Milton Nelson, Jr.
*Attorney, Agent, or Firm*—Marshall, O'Toole, Gerstein, Murray & Borun

[57] ABSTRACT

The seat back of a vehicle seat includes a lateral airbag in a casing which is integrated into the seat back and which has a front face with an exit opening for the airbag. The cover of the seat back includes a slot in corresponding relationship to the exit opening and the edges of the slot are fixed to the casing on respective opposite sides of the exit opening.

15 Claims, 7 Drawing Sheets

6,050,636

VEHICLE SEAT PROVIDED WITH A LATERAL AIRBAG

FIELD OF THE INVENTION

The present invention concerns vehicle seats provided with lateral airbags.

In particular, the invention concerns a vehicle seat including a seat back that includes upholstery covered by a flexible cover, the seat back having a front face adapted to support the back of a user and two lateral edges surrounding said front face, said seat back further including at least one safety device including an inflatable bag adapted to inflate its bag and to deploy it laterally relative to the user if the vehicle sustains a predetermined impact, the safety device being disposed in a casing having a lateral wall and a front face that is adapted to open and to free a passage for the back of the safety device to exit through when said bag inflates, said exit passage being delimited between two edges that are part of the casing and that are normally adjacent, and said casing being integrated into the upholstery on one lateral edge of the seat back.

BACKGROUND OF THE INVENTION

In prior art seats of the above type, the cover of the seat back entirely covers the front face of the safety device casing, the cover having a tearable seam in corresponding relationship to said front face.

The above prior art seats have the following drawbacks:

- it can be difficult to position the tearable seam in the cover perfectly relative to the front face of the casing: if it is not positioned correctly, the safety device can malfunction or even not function at all if the vehicle suffers an accident, and
- it is necessary to validate correct operation of the safety device for each design of seat back cover, because the operation of said safety device involves tearing said cover: given the large number of cover designs possible for each vehicle model, this entails a very large number of costly tests.

OBJECTS AND SUMMARY OF THE INVENTION

An aim of the present invention is to overcome the above drawbacks.

To this end, in accordance with the invention, a seat of the kind in question is essentially characterized in that the cover covers the casing and includes a slot delimited by first and second adjacent edges which are part of the cover and which are disposed in corresponding relationship to the two edges of the exit passage in the front wall of the casing, the two edges of the slot being fixed to the casing on respective opposite sides of said exit passage.

These arrangements circumvent the problems of positioning the seat back cover because the edges of the slot in the cover are fixed to the casing and no tearable seam is required in said cover, with the result that it is no longer necessary to validate correct operation of the safety device for each cover design.

One or more of the following features can be used in preferred embodiments of the invention:

- the exit passage in the front face of the casing is near the lateral wall of the casing, the two edges of the exit passage being attached one to the side wall of the casing and the other to a closure wall that is part of the front face of the casing and which can be raised relative to a fixed part of said casing to open the exit passage, the first edge of the slot in the cover being fixed to the side wall of the casing and the second edge of said slot being fixed to the closure wall;
- the side wall of the casing has a mobile part that carries the first edge of the slot in the cover and which is adapted to move away from the fixed part of the casing, compressing the upholstery of the seat back and widening the exit passage, when the bag of the safety device inflates;
- the exit passage in the front face of the casing is bordered by a channel attached to the side wall of the casing and opens laterally towards the outside of the seat back, the first edge of the slots in the cover being engaged in said channel and this first edge being provided with retaining means that co-operate with complementary retaining means in the channel to hold said first edge in said channel;
- the channel along the exit passage in the front face of the casing is formed in one piece with the plastics material side wall of the casing, said channel having a substantially U-shape cross-section with an outside wall, an inside side wall formed by the side wall of the casing and a back wall joining said outside and inside side walls;
- the channel along the exit opening in the casing has a substantially U-shape cross-section with an outside side wall away from the casing, an inside side wall nearer said casing and a back wall joining said outside and inside side walls, the outside side wall including inwardly projecting rims that constitute said complementary retaining means, the retaining means attached to the edge of the cover comprising a substantially J-section flexible section which is open towards the outside of the seat back and which has, on the one hand, an inside branch fixed to the edge of the cover and, on the other hand, an outside branch that hooks behind the projecting rims on the outside side wall of the channel;
- the second edge of the slot in the cover is mounted on a flat section that extends parallel to the front face of the casing and is fixed to the closure wall of said front face;
- the slot in the cover is extended beyond the casing of the safety device by two end portions on respective opposite sides of said casing, said two end portions being adapted to open when the bag of the safety device inflates;
- at least one edge of the slot in the cover is free along at least part of one end portion of said slot in the vicinity of the casing;
- the two edges of the exit passage in the front face of the casing are attached one to the side wall of the casing and the other to a closure wall that is part of the front face of the casing and which can be raised relative to a fixed part of said casing on opening the exit passage, the first edge of the slot in the cover being mounted, at the level of at least one end portion of said slot, on a section that is attached to the side wall of the casing;
- the two edges of the exit passage in the front face of the casing are attached one to the side wall of the casing and the other to a closure wall that is part of the front face of the casing and which can be raised relative to a fixed part of said casing on opening the exit passage, the second edge of the slot in the cover being mounted, at the level of at least one end portion of said slot, on a section attached to the closure wall of the front face of the casing;

the front face of the casing of the safety device is covered by a cover section attached to said casing and having an exit passage which extends in a longitudinal direction substantially parallel to the slot in the cover and which is disposed in corresponding relationship to the exit passage in the front face of the casing, the cover section further including first and second longitudinal parts disposed on respective opposite sides of the exit passage of said section, the first longitudinal part of the cover section being fixed to the first edge of the slot in the cover, the second longitudinal part of said section being fixed to the second edge of the slot in the cover, and the two longitudinal parts of the cover section being joined together by at least one flexible connection disposed at one end at least of the exit passage of the section, said exit passage being normally closed and said flexible connection being adapted to allow said exit passage to open and at the same time as the exit passage in the front face of the casing;

the exit passage in the front face of the casing is near the side wall of said casing, the two edges of said exit passage being attached one to the side wall of the casing and the other to a closure wall that is part of the front face of the casing and which can be raised relative to a fixed part of said casing on opening the exit passage of the casing, the second longitudinal part of the cover section being fixed to the closure wall and the first longitudinal part of the cover section forming a channel along the side wall of the casing that is open laterally outwards of the seat back, the first edge of the slot in the cover being engaged in said channel, and said first edge being provided with retaining means that co-operate with complementary retaining means in the channel to hold said first edge in said channel;

the cover section has first and second lateral edges extending substantially in said longitudinal direction between two end edges, the first lateral edge including said channel of the section and the cover section further including a thin film that can be bent and which extends from the channel to the second lateral edge of the section, said thin film having a U-shape slot that has a longitudinal central part and two lateral branches extending towards the second lateral edge of the section as far as two ends at the level of which the thin film is folded on itself along two fold lines each of which extends between one end of the U-shape slot and one end edge of the cover section, said two folding lines and the U-shape slot delimiting said first and second longitudinal parts of the cover section and the fold lines constituting said flexible connection, the first longitudinal part of the section including said channel and being disposed directly against the front face of the casing, the second longitudinal part of the section including the second lateral edge of said section and also including a tongue that is delimited by the U-shape slot, said second longitudinal part of the section being folded over the first longitudinal part substantially at 180°, said tongue being fixed directly against the closure wall of the front face of the casing and extending away from the first and second lateral edges of the section, uncovering a central opening that is disposed above the exit passage in the front face of the casing and which is covered by the second longitudinal part of the section, said central opening constituting the exit passage of the cover section;

the first longitudinal part of the cover section includes a weakened area between the central cut-out and each end edge and is adapted to break when the exit passage in the front face of the casing opens, separating, on the one hand, the channel from the section and, on the other hand, the second longitudinal part from said section.

BRIEF DESCRIPTION OF THE DRAWINGS

Other features and advantages of the invention will become apparent in the course of the following description of various embodiments of the invention given by way of non-limiting examples and with reference to the accompanying drawings.

In the drawings.

MORE DETAILED DESCRIPTION

Figure 1:
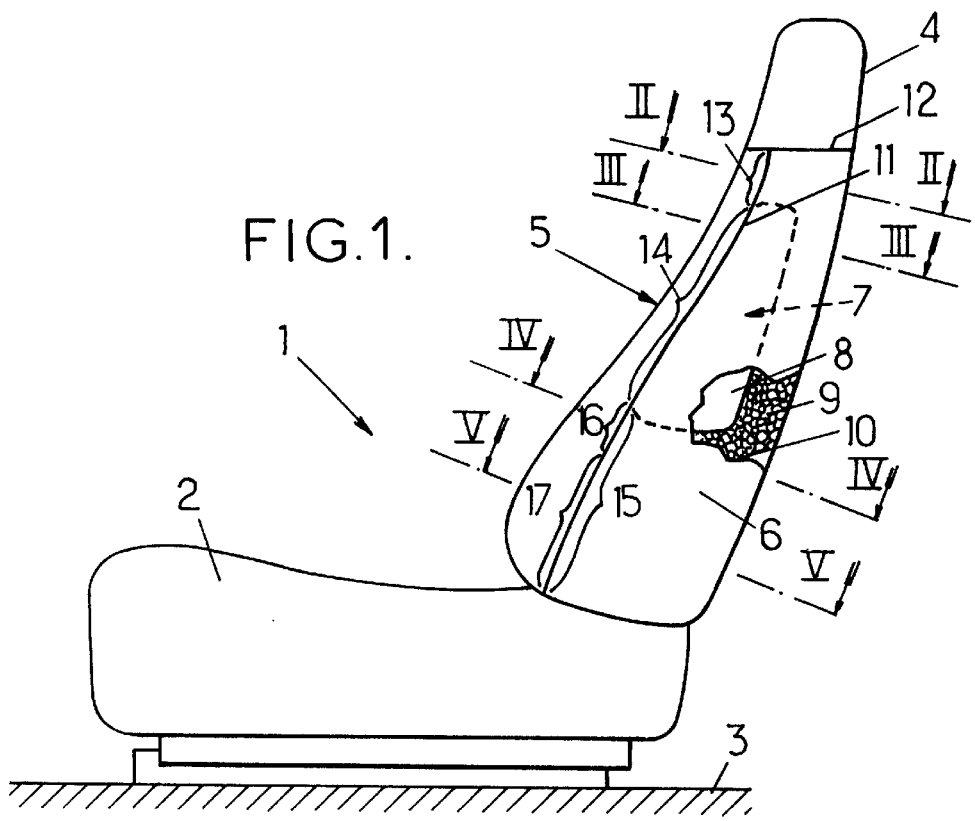
FIG. 1 is a diagrammatic view of a seat provided with a first embodiment of a safety device in accordance with the invention.

FIG. 1 shows a seat 1 of an automobile vehicle which includes a seat squab 2 mounted on the floor 3 of the vehicle and seat back 4 mounted on the squab.

The seat back 4 has a front face 5 which is designed to support the back of a user and two lateral edges 6 which surround said front face (only one of the lateral edges can be seen in FIG. 1).

At least one of the two lateral edges 6, generally that towards the outside of the vehicle, is provided with an inflatable bag safety device ("airbag") 7 that is adapted to inflate its bag (generally by means of a pyrotechnic device) to deploy it laterally of the user of the seat when the vehicle is subject to a predetermined impact.

The safety device 7 is disposed in a closed casing 8 made from a plastics material, for example, which is integrated into the foam upholstery 9 of the seat back 4 and which is covered by the fabric, leather or other flexible material 10 covering the seat back.

To enable the safety device 7 to operate, the cover 10 has a substantially vertical slot 11 through which the airbag can exit the safety device in the event of an accident.

The slot 11 extends along the side 6 of the seat back from a horizontal seam 12 to the bottom end of the seat back 4. In the present example said slot is divided into three portions, namely:

an upper end portion 13, a central portion 14 disposed in corresponding relationship to the casing 8 of the safety device, and a lower end portion 15 which is in turn subdivided into two parts 16, 17 to be described hereinafter.

Figure 2:
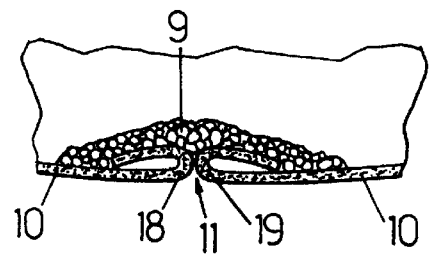
FIGS. 2 through 5 are sectional partial views of the seat back of the seat shown in FIG. 1 respectively taken along the lines II—II, III—III, IV—IV and V—V in FIG. 1.

As shown in FIG. 2, the two edges 18, 19 of the slot 11 are simply left free along the upper end portion 13 which generally extends a short distance, for example 5 cm to 10 cm.

Figure 3:
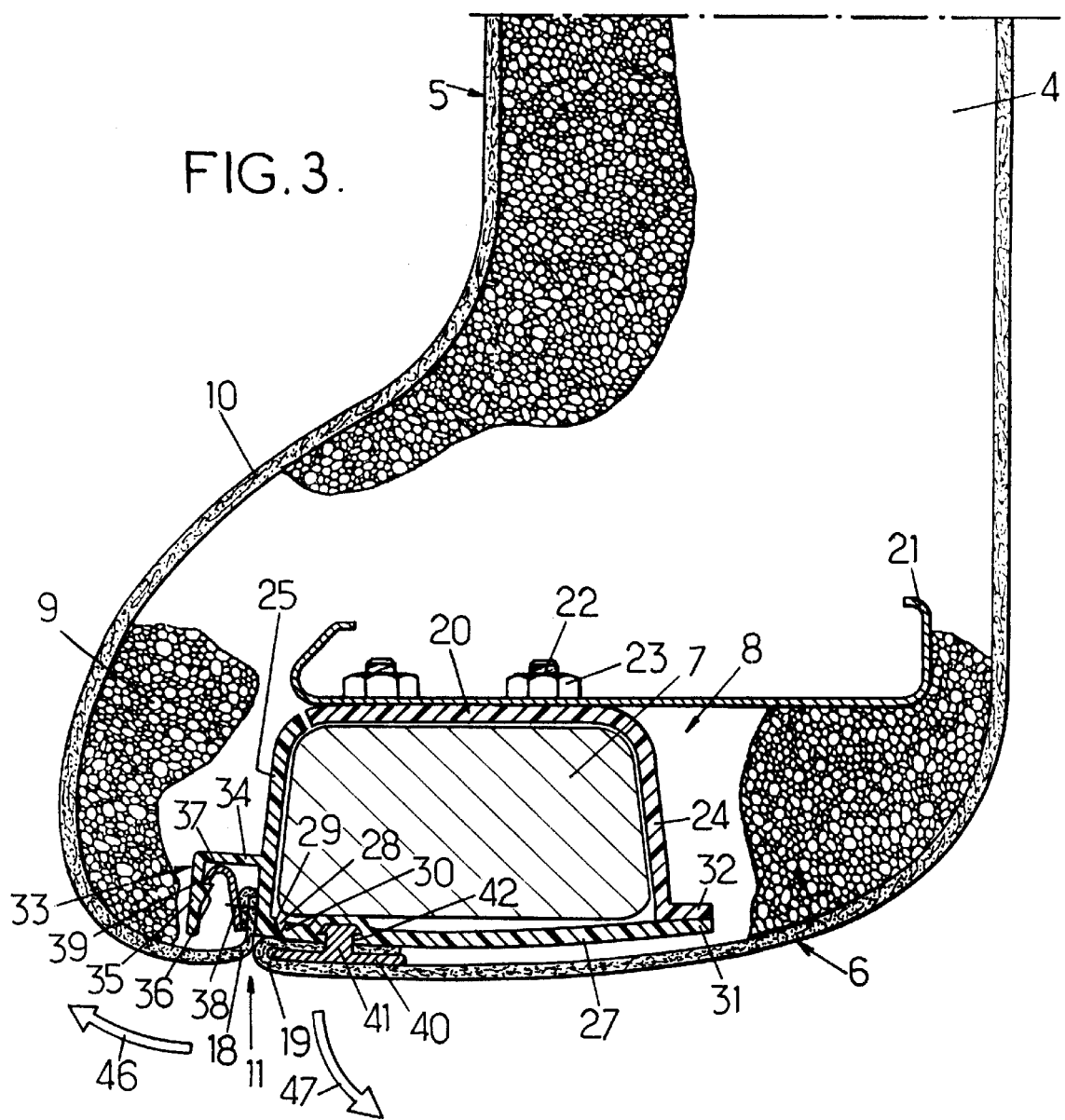
Figure 6:
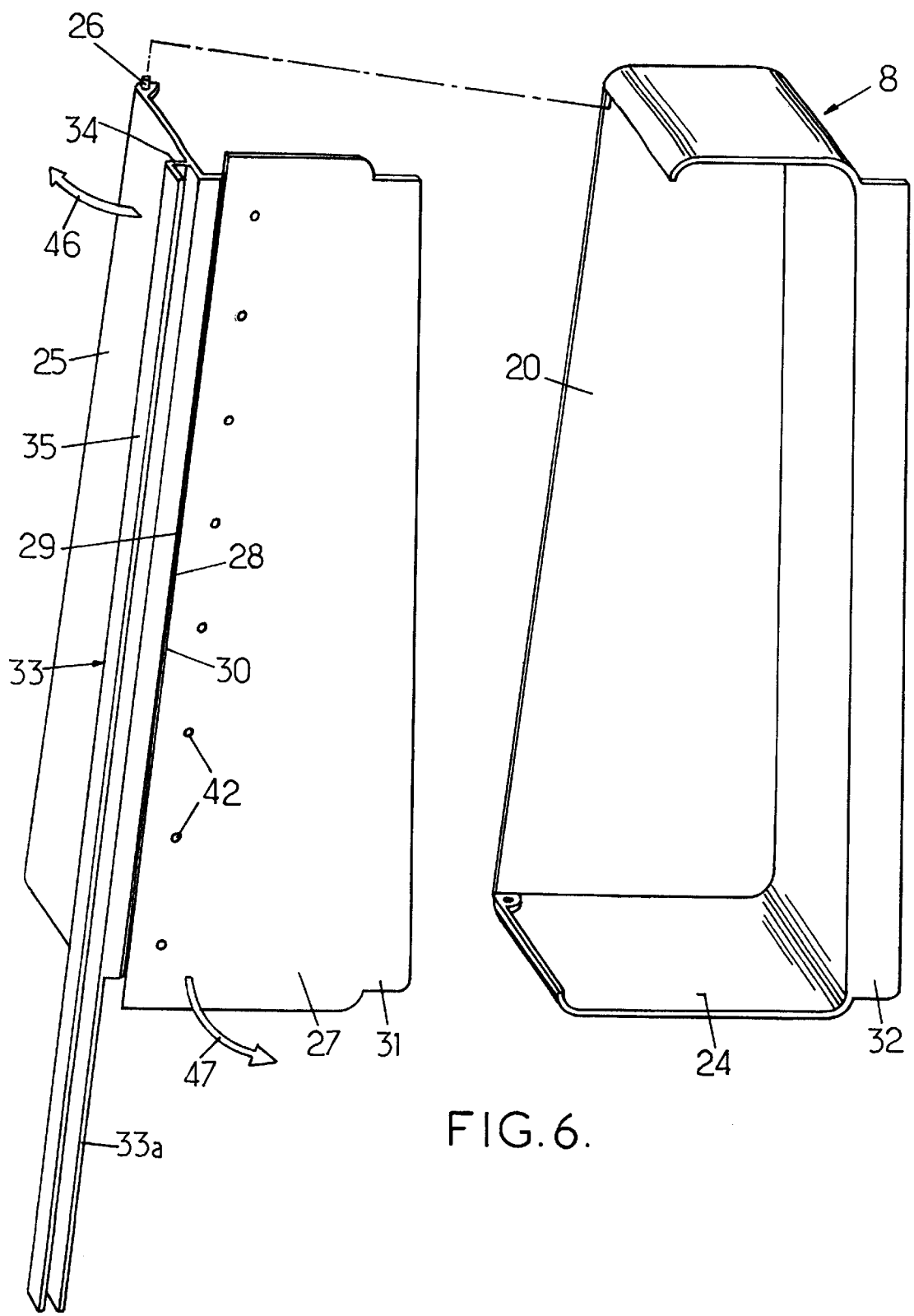
FIG. 6 is an exploded view of the casing of the safety device which is part of the seat back of the seat shown in FIG. 1.

Along the central portion 14, on the other hand, the two edges 18, 19 of the slot 11 are fixed to the casing 8 of the safety device, and this casing is shown in detail in FIGS. 3 and 6.

The casing 8 has a fixed part which includes:

on the one hand, a back wall 20 fixed to the metal framework 21 of the seat back, for example by means of nuts and bolts 22, 23, and on the other hand, a first side wall portion 24 that surrounds the safety device 7 at the top, at the bottom and at the rear.

The casing 8 additionally includes a mobile part which includes:

on the one hand, a second side wall portion 25 disposed towards the front relative to the safety device 7 and which is mounted to pivot relative to the side wall portion 24 about pivots 26 near the back wall 20 of the casing, and on the other hand, a front wall 27 that is oriented towards the outside of the seat back and which is joined to the side wall portion 25 by a weakened area formed, for example, by a vertical groove 28 in the mobile part of the casing near the side wall portion 25, the groove 28 being adapted to break when the airbag of the safety device inflates, forming an exit opening for the bag.

The exit opening for the airbag is therefore delimited between the two edges 29, 30 of the groove 28 which respectively form part of the side wall portion 25 and the front face 27 of the casing.

At the level of the rear side of the side wall portion 24 the front face 27 of the casing has an edge 31 that is glued, welded or otherwise attached to a rim 32 of that rear side and the upper and lower ends of the front face 27 of the casing are not fixed to the top and bottom sides of the side wall portion 24 of said casing.

Finally, the slot 11 in the cover is disposed in substantially corresponding relationship to the groove 28, the edge 18 of the slot being fixed to the side wall portion 25 and the edge 19 of the slot being fixed to the front face 27 of the casing, or more generally to the closing wall of that front face that normally covers the exit opening for the airbag.

In particular, the side wall portion 25 is molded in one piece with a U-section channel 33 opening laterally outwards of the seat back, the channel having:

an inside side wall consisting of the side wall portion 25, a back wall 34, and an outside side wall 35 having rims 36 projecting towards the interior of the channel.

The edge 18 of the cover is sewn or otherwise fixed to a J-section plastics material attachment section 37 opened towards the exterior of the seat back which has, on the one hand, an inside branch 38 fixed to the edge 18 of the cover and, on the other hand, an outside branch 39 which hooks behind the projecting rims 36 on the outside side wall 35 of the channel.

The edge 19 of the cover is folded over and sewn, glued or otherwise fixed to a flat plastics material section 40 that clips onto the front face 27 of the casing by virtue of tenons 41 on the section engaging in holes 42 in said front face 27.

Figure 4:
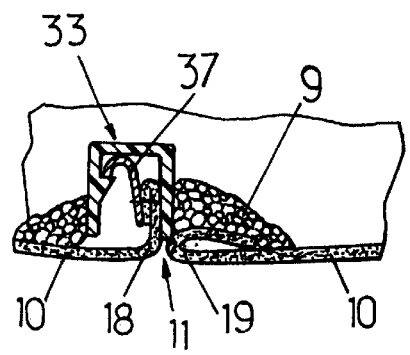
Figure 5:
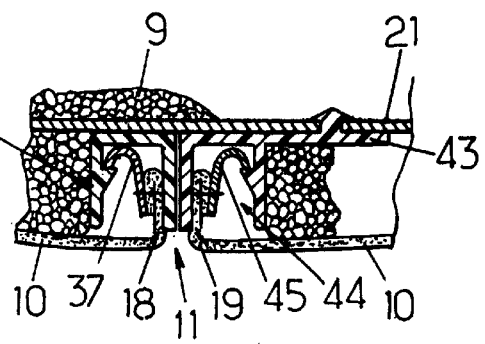

Finally, as shown in FIGS. 4, 5 and 6, the channel 33 is extended downwards by a portion 33a that forms a channel similar to the channel 33 and extends the whole length of the bottom end portion 15 of the slot 11.

The edge 18 of the cover is also fixed into this groove over the entire length of the bottom end portion 15 by means of the section 37 described hereinabove.

On the other hand, the edge 19 of the cover is free in the part 16 of the portion 15 nearest the casing 8, which part 16 is relatively short, for example between 2 cm and 5 cm long.

Finally, the edge 19 of the cover is fixed to the framework 21 of the seat back in the lower part 17 of the lower end portion 15 of the slot 11, for example by means of a plastics material section 43 that is clipped or otherwise fixed to the framework 21 and which forms a channel 44 similar to the channel 33, the edge 19 of the cover being attached to a J-section attachment section 45 similar to the attachment section 37 mentioned above and engaged in the groove 44.

The device that has just been described operates as follows:

if the vehicle suffers an accident the safety device 7 triggers the inflation of its bag which ruptures the grooved area 28 of the casing with the result that:

the side wall portion 25 pivots in the direction of the arrow 46 in FIGS. 3 and 6, crushing the upholstery 9 of the seat back, and the front face 27 of the casing is raised at the front end, in the direction of the arrow 47 in FIGS. 3 and 6, enabling the airbag to exit via the slot 11 in the cover.

The movements of the mobile parts of the casing 8 are made possible by the flexibility of the cover 10 and are facilitated by the fact that at least one edge of the slot 11 in said cover is left free in the areas 13 and 16 of the slots 11.

Figure 7:
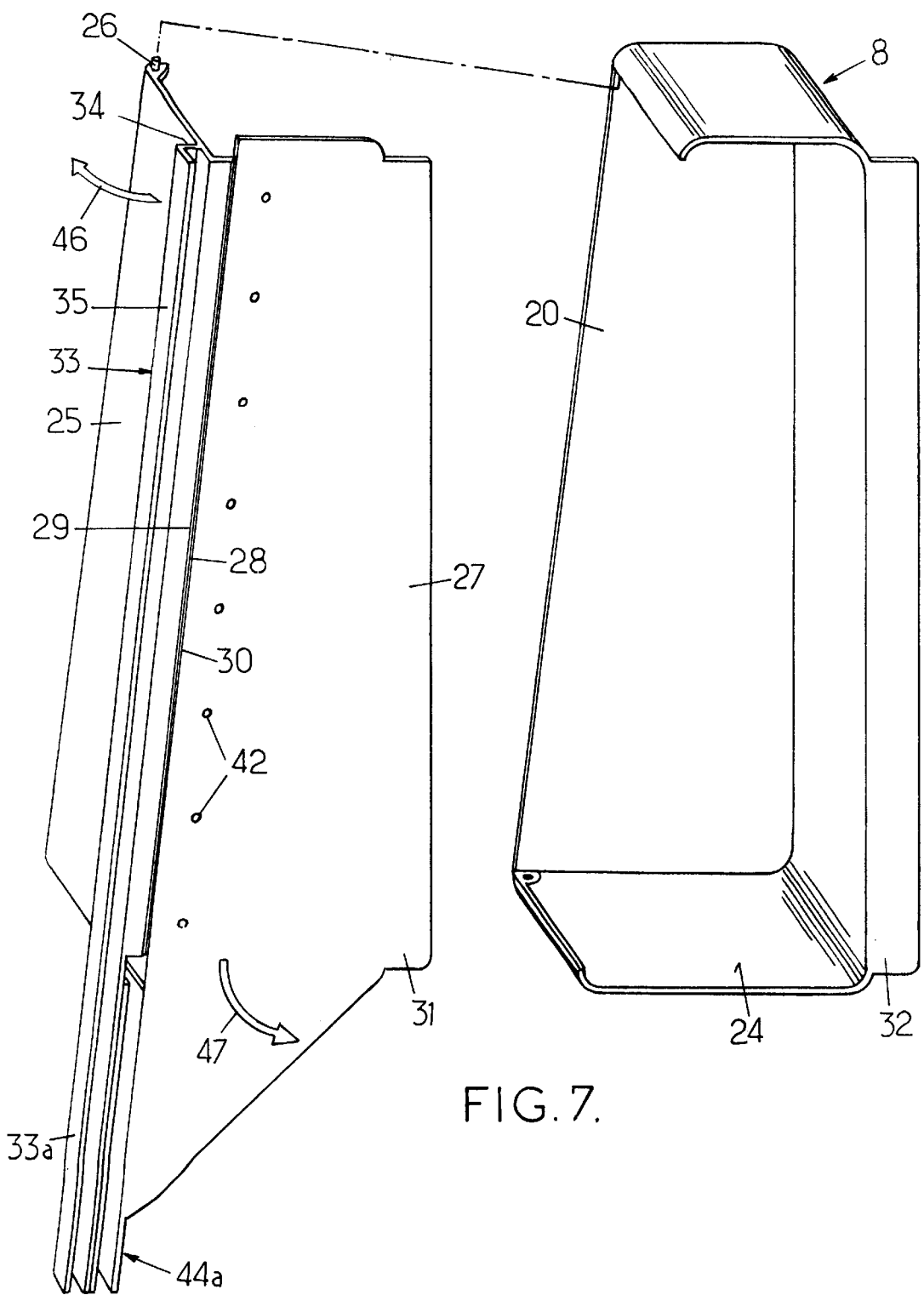
FIG. 7 is a view similar to FIG. 6 showing one variant of the first embodiment of the invention.

In a variant, as shown in FIG. 7, the channel 44a could be replaced by a similar channel delimited by a U-section 44a attached to the front face 27 of the casing.

In this case the section 44a can extend substantially all of the length of the end portion 15 of the slot 11 and the edge 19 of that slot can be fixed into that section, also along the entire length of the portion 15, because the groove 44 is raised with the front wall 27 of the casing when the safety device 7 is triggered.

Figure 8:
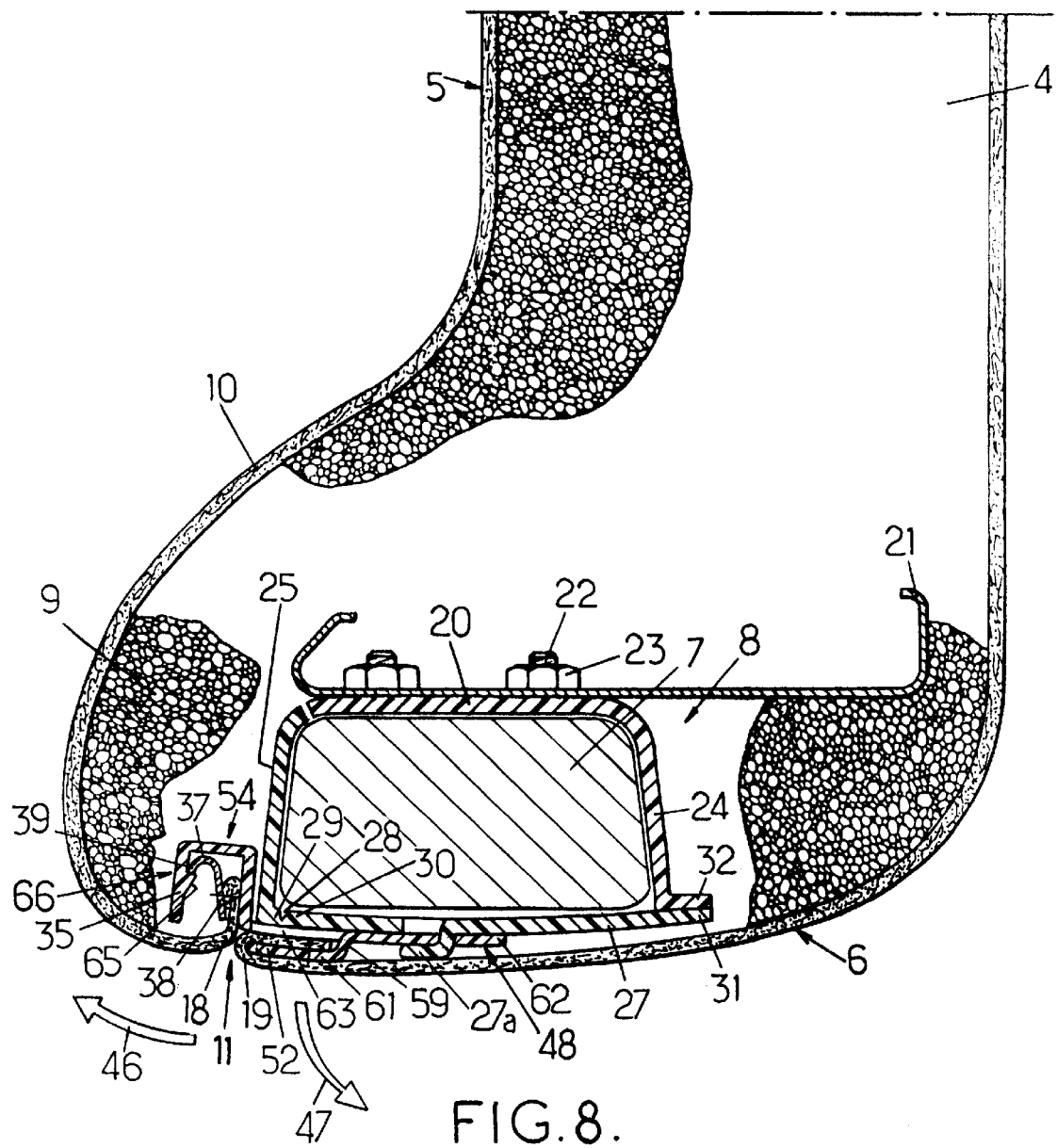
FIG. 8 is a view similar to FIG. 3 showing a second embodiment of the invention.

In the second embodiment shown in FIGS. 8 through 10 the casing 8 of the safety device is similar to the casing of the first embodiment described hereinabove with reference to FIGS. 1 through 6, except that:

the casing 8 does not have any channel 33 to fix the edge 18 of the slot in the cover, and the front wall 27 of the casing includes hooks 27a.

The front wall 27 of the casing 8 is also covered by a cover section 48 made from a plastics material that can be bent.

Figure 10:
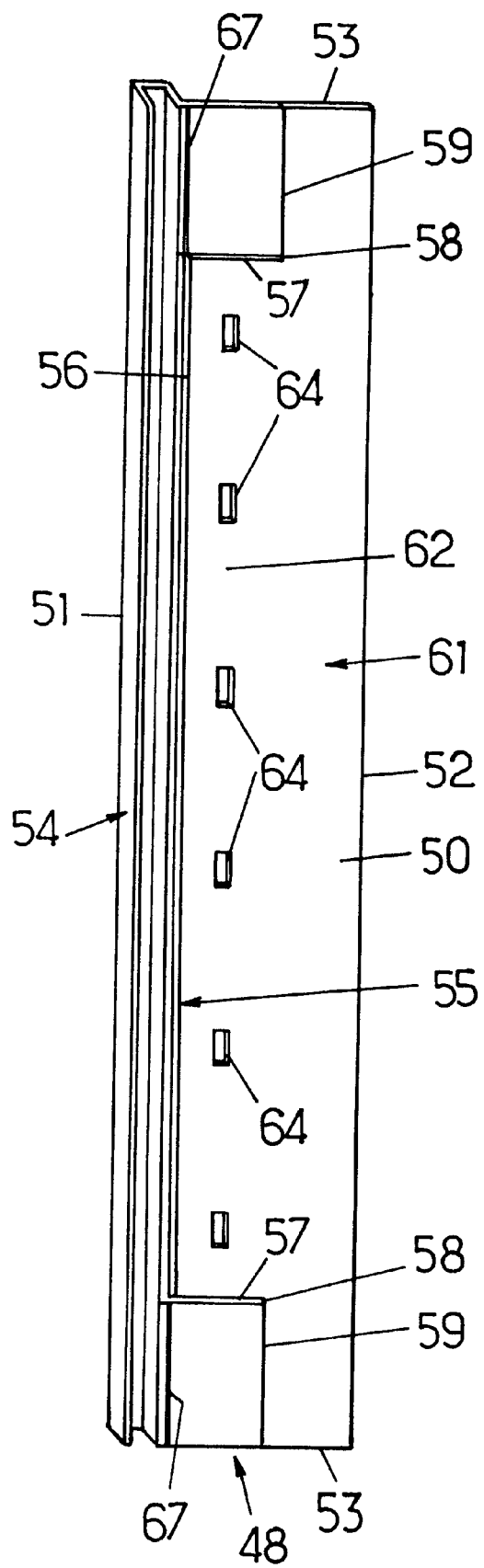
FIG. 10 is a view of the cover section from FIG. 9 before it is bent to shape.

As shown in FIG. 10, the cover section is initially in the form of a sheet 50 of relatively thin plastics material which can be bent and which has two longitudinal lateral edges 51, 52 extending between two end edges 53, the lateral edge 51 being thicker and constituting a relatively rigid U-shape channel 54 opening laterally outwards of the seat back.

The edges 51, 52 can have a curved shape to match the curvature of the seat back.

The thin film 50 of the section has a U-shape slot 55 with a central part 56 parallel to the lateral edges 51 and 52 and two lateral branches 57 that extend towards the lateral edge 52 from the central part 56.

From the two ends 58 of the U-shape slot the thin film 50 of plastics material has two fold lines 59 that enable the lateral edges 51, 52 to face each other and which can be formed by a shallow groove in said thin film of plastics material, for example.

The fold lines 59 and the slot 55 subdivide the cover section 48 into first and second longitudinal parts 60, 61, the first longitudinal part 60 essentially comprising the groove 54 and the second longitudinal part 61 comprising the greater part of the plastics material film 50, including a tongue 62 delimited inside the U-shape slot 55.

The edge 19 of the slot in the cover is sewn or fixed by any other known means along the lateral edge 52 of the section 48 after which the section is folded on itself along the fold lines 59 so that the second longitudinal part 61 of the section covers the longitudinal part 60 of said section between the lateral branches 57 of the U-shape slot 55 and the end edges 53 without covering the groove 54.

Figure 9:
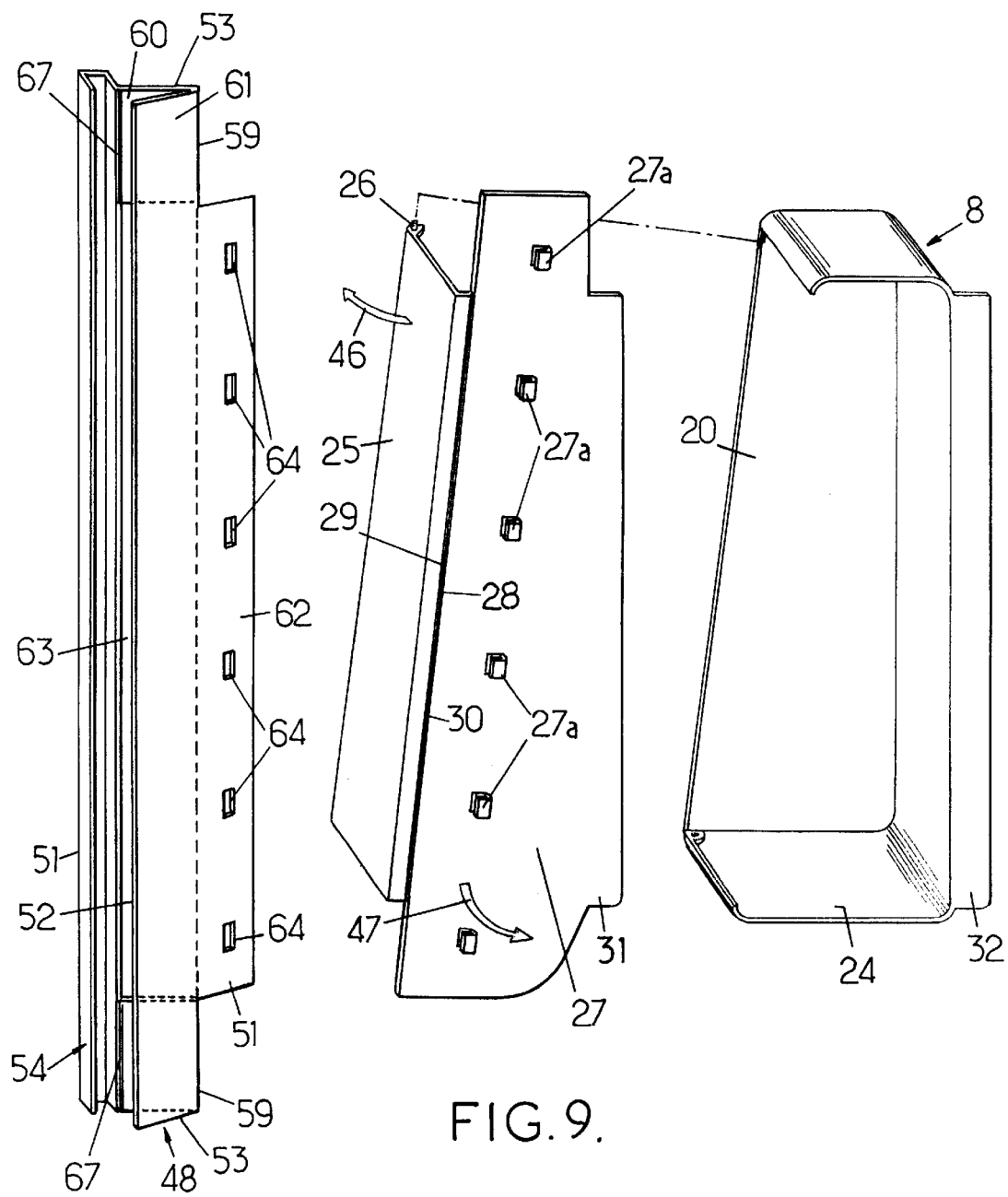
FIG. 9 is a exploded view of the casing of the safety device from FIG. 8 with a covering section that normally covers the casing.

In this position, shown clearly in FIG. 9, pivoting of the tongue 62 uncovers an opening 63 in corresponding relationship to the U-shape slot 55, the opening 63 being covered by the second longitudinal part 61 of the section.

The cover section 48 is then fitted over the front wall 27 of the casing 8, the longitudinal first part 60 of this section resting directly on the front wall 27, and likewise the tongue 62, which has recesses 64 in which the hooks 27a on said front wall 27 engage.

Mechanical connections can further be provided between the wall of the groove 54 and the side wall 25 of the casing.

The edge 18 of the slot 11 in the cover is fixed to the section 37 described hereinabove, seen in FIG. 8, and the attachment section 37 is fixed into the groove 54 in the same manner as it was fixed into the channel 33 in the embodiment described hereinabove by hooking behind projecting rims 65 inside the channel 54, preferably in its outside lateral wall 66.

In this embodiment, when the safety device operates, the grooved area 28 of the front wall 27 of the casing ruptures as in the previous examples, allowing the inflatable bag of the safety device to exit, the inflatable bag exiting the seat back via the slot 11 in the cover and raising the second longitudinal part 61 of the cover section 48, the side wall 25 of the casing then deforming the first longitudinal part 60 of the cover section 48.

The cover section 48 preferably has two weakened areas 67, in the form of grooves, for example, extending between the opening 63 and the end edges 53 of the section: these fragile areas are adapted to break and uncover the groove 54 when the safety device is triggered, which further facilitates pivoting of the side wall 25 of the casing.

We claim:

1. A seat for a vehicle, said seat including a seat back that includes upholstery covered by a flexible cover, the seat back having a front face adapted to support the back of a user and two lateral edges surrounding said front face, said seat back further including at least one safety device including an inflatable bag adapted to inflate its bag and to deploy it laterally relative to the user if the vehicle sustains a predetermined impact, the safety device being disposed in a substantially rigid casing having a lateral wall and a front face that is adapted to open and to free a passage for the back of the safety device to exit through when said bag inflates, said exit passage being delimited between two edges that are part of the casing and that are normally adjacent, and said casing being integrated into the upholstery on one lateral edge of the seat back, wherein the cover covers the casing and includes a slot delimited by first and second adjacent edges which are part of the cover and which are disposed in corresponding relationship to the two edges of the exit passage in the front wall of the casing, the two edges of the slot being directly and rigidly fixed to the casing on respective opposite sides of said exit passage, the slot extending longitudinally between two ends and the two edges of the slot being substantially free of mutual binding between said two ends.

2. A seat according to claim 1 wherein the exit passage in the front face of the casing is near the lateral wall of the casing, the two edges of the exit passage being attached one to the side wall of the casing and the other to a closure wall that is part of the front face of the casing and which can be raised relative to a fixed part of said casing to open the exit passage, the first edge of the slot in the cover being fixed to the side wall of the casing and the second edge of said slot being fixed to the closure wall.

3. A seat according to claim 2 wherein the side wall of the casing has a mobile part that carries the first edge of the slot in the cover and which is adapted to move away from the fixed part of the casing, compressing the upholstery of the seat back and widening the exit passage, when the bag of the safety device inflates.

4. A seat according to claim 2 wherein the exit passage in the front face of the casing is bordered by a channel attached to the side wall of the casing and opens laterally towards the outside of the seat back, the first edge of the slot in the cover being engaged in said channel and this first edge being provided with retaining means that co-operate with complementary retaining means in the channel to hold said first edge in said channel.

5. A seat according to claim 4 wherein the channel along the exit passage in the front face of the casing is formed in one piece with a plastics material side wall of the casing, said channel having a substantially U-shape cross-section with an outside wall, an inside side wall formed by the side wall of the casing and a back wall joining said outside and inside side walls.

6. A seat according to claim 4 wherein the channel along the exit opening in the casing has a substantially U-shape cross-section with an outside side wall away from the casing, an inside side wall nearer said casing and a back wall joining said outside and inside side walls, the outside side wall including inwardly projecting rims that constitute said complementary retaining means, the retaining means attached to the edge of the cover comprising a substantially J-section flexible section which is open towards the outside of the seat back and which has, on one hand, an inside branch fixed to the edge of the cover and, on another hand, an outside branch that hooks behind the projecting rims on the outside side wall of the channel.

7. A seat according to claim 2 wherein the second edge of the slot in the cover is mounted on a flat section that extends parallel to the front face of the casing and is fixed to the closure wall of said front face.

8. A seat according claim 1 wherein the slot in the cover is extended beyond the casing of the safety device by two end portions on respective opposite sides of said casing, said two end portions being adapted to open when the bag of the safety device inflates.

9. A seat according to claim 8 wherein at least one edge of the slot in the cover is free along at least part of one end portion of said slot in the vicinity of the casing.

10. A seat according to claim 8 wherein the two edges of the exit passage in the front face of the casing are attached one to the side wall of the casing and the other to a closure wall that is part of the front face of the casing and which can be raised relative to a fixed part of said casing on opening the exit passage, the first edge of the slot in the cover being mounted, at the level of at least one end portion of said slot, on a section that is attached to the side wall of the casing.

11. A seat according to claim 8 wherein the two edges of the exit passage in the front face of the casing are attached one to the side wall of the casing and the other to a closure wall that is part of the front face of the casing and which can be raised relative to a fixed part of said casing on opening the exit passage, the second edge of the slot in the cover being mounted, at the level of at least one end portion of said slot, on a section attached to the closure wall of the front face of the casing.

12. A seat according to claim 1 wherein the front face of the casing of the safety device is covered by a cover section attached to said casing and having an exit passage which extends in a longitudinal direction substantially parallel to the slot in the cover and which is disposed in corresponding relationship to the exit passage in the front face of the casing, the cover section further including first and second longitudinal parts disposed on respective opposite sides of the exit passage of said section, the first longitudinal part of the cover section being fixed to the first edge of the slot in the cover, the second longitudinal part of said section being fixed to the second edge of the slot in the cover, and the two longitudinal parts of the cover section being joined together by at least one flexible connection disposed at one end at least of the exit passage of the section, said exit passage being normally closed and said flexible connection being adapted to allow said exit passage to open and at the same time as the exit passage in the front face of the casing.

13. A seat according to claim 12 wherein the exit passage in the front face of the casing is near the side wall of said casing, the two edges of said exit passage being attached one to the side wall of the casing and the other to a closure wall that is part of the front face of the casing and which can be raised relative to a fixed part of said casing on opening the exit passage of the casing, the second longitudinal part of the cover section being fixed to the closure wall and the first longitudinal part of the cover section forming a channel along the side wall of the casing that is open laterally outwards of the seat back, the first edge of the slot in the cover being engaged in said channel, and said first edge being provided with retaining means that co-operate with complementary retaining means in the channel to hold said first edge in said channel.

14. A seat according to claim 13 wherein the cover section has first and second lateral edges extending substantially in said longitudinal direction between two end edges, the first lateral edge including said channel of the section and the cover section further including a thin film that can be bent and which extends from the channel to the second lateral edge of the section, said thin film having a U-shape slot that has a longitudinal central part and two lateral branches extending towards the second lateral edge of the section as far as two ends at the level of which the thin film is folded on itself along two fold lines each of which extends between one end of the U-shape slot and one end edge of the cover section, said two folding lines and the U-shape slot delimiting said first and second longitudinal parts of the cover section and the fold lines constituting said flexible connection, the first longitudinal part of the section including said channel and being disposed directly against the front face of the casing, the second longitudinal part of the section including the second lateral edge of said section and also including a tongue that is delimited by the U-shape slot, said second longitudinal part of the section being folded over the first longitudinal part substantially at 180°, said tongue being fixed directly against the closure wall of the front face of the casing and extending away from the first and second lateral edges of the section, uncovering a central opening that is disposed above the exit passage in the front face of the casing and which is covered by the second longitudinal part of the section, said central opening constituting the exit passage of the cover section.

15. A seat according to claim 14 wherein the first longitudinal part of the cover section includes a weakened area between the central cut-out and each end edge and is adapted to break when the exit passage in the front face of the casing opens, separating, on the one hand, the channel from the section and, on the other hand, the second longitudinal part from said section.

* * * * *